United States Patent
Guo et al.

(10) Patent No.: US 9,606,398 B2
(45) Date of Patent: Mar. 28, 2017

(54) LIQUID CRYSTAL DISPLAY DEVICE

(71) Applicants: BOE TECHNOLOGY GROUP CO., LTD., Beijing (CN); BEIJING BOE DISPLAY TECHNOLOGY CO., LTD., Beijing (CN)

(72) Inventors: Junjie Guo, Beijing (CN); Yanping Liao, Beijing (CN); Xibin Shao, Beijing (CN); Dan Wang, Beijing (CN); Daekeun Yoon, Beijing (CN); Bin Zou, Beijing (CN)

(73) Assignees: BOE TECHNOLOGY GROUP CO., LTD., Beijing (CN); BEIJING BOE DISPLAY TECHNOLOGY CO., LTD., Beijing (CN)

( * ) Notice: Subject to any disclaimer, the term of this patent is extended or adjusted under 35 U.S.C. 154(b) by 115 days.

(21) Appl. No.: 14/360,865

(22) PCT Filed: Jun. 19, 2013

(86) PCT No.: PCT/CN2013/077482
§ 371 (c)(1),
(2) Date: May 27, 2014

(87) PCT Pub. No.: WO2014/146361
PCT Pub. Date: Sep. 25, 2014

(65) Prior Publication Data
US 2015/0301405 A1    Oct. 22, 2015

(30) Foreign Application Priority Data
Mar. 18, 2013    (CN) .......................... 2013 1 0086324

(51) Int. Cl.
G02F 1/1333    (2006.01)
G02F 1/1335    (2006.01)

(52) U.S. Cl.
CPC .. G02F 1/133608 (2013.01); G02F 1/133308 (2013.01); G02F 1/133611 (2013.01);
(Continued)

(58) Field of Classification Search
CPC ......... G02F 1/133308; G02F 1/133608; G02F 2001/133317; G02F 2001/133322; G02F 1/133611
(Continued)

(56) References Cited

U.S. PATENT DOCUMENTS

2007/0109461 A1*    5/2007  Park ..................... G02B 6/0086
349/58

FOREIGN PATENT DOCUMENTS

CN    1967351 A    5/2007
CN    100504546 C    6/2009
(Continued)

OTHER PUBLICATIONS

Third Chinese Office Action Appln. No. 201310086324.7; Dated Aug. 11, 2015.
(Continued)

Primary Examiner — Nathanael R Briggs
Assistant Examiner — William Peterson
(74) Attorney, Agent, or Firm — Ladas & Parry LLP

(57) ABSTRACT

A liquid crystal display device is disclosed. The LCD device includes a liquid crystal panel and a backlight module, wherein the liquid crystal panel is hung onto the backlight module when the LCD device is placed in a vertical state.

18 Claims, 6 Drawing Sheets

(52) U.S. Cl.
    CPC ............ *G02F 2001/133317* (2013.01); *G02F 2001/133322* (2013.01)

(58) Field of Classification Search
    USPC .......................................................... 348/58
    See application file for complete search history.

(56) References Cited

FOREIGN PATENT DOCUMENTS

| | | |
|---|---|---|
| CN | 102809833 A | 12/2012 |
| CN | 203117604 U | 8/2013 |

OTHER PUBLICATIONS

International Preliminary Report on Patentability Appln. No. PCT/CN2013/077482; Dated Sep. 22, 2015.
International Search Report Appln. No. PCT/CN2013/077482; Dated Nov. 21, 2013.
First Chinese Office Action Appln. No. 201310086324.7; Dated Jan. 19, 2015.
Second Chinese Office Action Appln. No. 201310086324.7; Dated Apr. 22, 2015.

\* cited by examiner

LIQUID CRYSTAL DISPLAY DEVICE

FIELD OF THE ART

Embodiments of the invention relate to the field of liquid crystal display technologies, more particularly, to a liquid crystal display (LCD) device.

BACKGROUND

A LCD device generally comprises a liquid crystal panel, a backlight module and a metal frame, wherein the liquid crystal panel is formed by assembling an array substrate and a color filter substrate to form a cell and filling liquid crystals into the cell; the backlight module comprises a light source, a light guide plate (LGP), an optical film sheet, a mold frame and a back plate; the mold frame fixes the light source, the LGP and the optical film sheet onto the back plate. As for a fixation method for the LCD panel, as illustrated in FIG. 1, a backlight module 2' is first placed horizontally, allowing a back plate 23' to face downwards and the a mold frame 22' face upwards, then a liquid crystal panel 1' is placed on the mold frame 22' horizontally; next, a stopper on the mold frame 22' abutting against a side face of the liquid crystal panel 1' is used to fix the liquid crystal panel to the mold frame 22'; finally a metal frame 3' is fixed to the backlight module 2', and the liquid crystal panel 1' is pressed against the backlight module 2', thereby fixing the liquid crystal panel 1'. As illustrated in FIG. 2, the assembled LCD is placed in a vertical state. In this case, the liquid crystal panel 1' will be bent and deformed as illustrated in FIG. 3 under the action of its own gravity, thereby causing the liquid crystal panel 1' and the metal frame 3' to press against each other, which will in turn cause the defects of uneven brightness under dark state and light leakage of the liquid crystal panel.

SUMMARY

An embodiment of the invention provides a LCD device, which prevents the defects of uneven brightness under dark state and light leakage of the liquid crystal panel.

A LCD device in accordance to an embodiment of the invention comprises a liquid crystal panel and a backlight module, wherein the liquid crystal panel is hung onto the backlight module when the LCD device is placed in a vertical state.

As an example, at least one hanging post is disposed on a side face of the liquid crystal panel which contacts the backlight;

the backlight module comprises a mold frame, at least one hanging groove for receiving the hanging post is disposed on a side face of the mold frame which contacts the liquid crystal panel.

As an example, a pad is disposed between bottom contact surfaces of the hanging post and the hanging groove, and the bottom contact surfaces contact with each other in a vertical direction.

As an example, the hanging post is adhered to the side face of the liquid crystal panel which contacts the mold frame.

As an example, a plurality of hanging posts are disposed juxtapositionally along a horizontal direction on an upper portion of the side face of the liquid crystal panel which contacts the mold frame, and a plurality of hanging grooves or one hanging groove for receiving the plurality of hanging posts altogether is disposed juxtapositionally along the horizontal direction on an upper portion of the mold frame.

As an example, a plurality of hanging posts are disposed juxtapositionally along a vertical direction on at least one side portion of the side face of the liquid crystal panel which contacts the mold frame, and a plurality of hanging grooves are disposed juxtapositionally along a vertical direction on at least one side portion of the mold frame.

As an example, at least one protrusion is disposed on a side face of the liquid crystal panel which contacts the backlight module, a groove is disposed on the protrusion;

the backlight module comprises a mold frame, at least one protruding post is disposed on a side face of the mold frame which contacts the liquid crystal panel, the protruding post is received in the groove.

As an example, a pad is disposed between top contact surfaces of the protruding post and the groove, the top contact surfaces contact with each other in a vertical direction.

As an example, the protruding post is adhered to the side face of the liquid crystal panel which contacts the mold frame.

As an example, a plurality of protrusions are disposed juxtapositionally along a horizontal direction on an upper portion of the side face of the liquid crystal panel which contacts the mold frame, and a plurality of protruding posts are disposed juxtapositionally along a horizontal direction on an upper portion of the mold frame.

As an example, a plurality of protrusions are disposed juxtapositionally along a vertical direction on at least one side portion of the side face of the liquid crystal panel which contacts the mold frame, and a plurality of protruding posts are disposed juxtapositionally along a vertical direction on at least one side portion of the mold frame.

BRIEF DESCRIPTION OF THE DRAWINGS

In order to clearly illustrate the technical solution of the embodiments of the invention, the drawings of the embodiments will be briefly described in the following. It is obvious that the described drawings are only related to some embodiments of the invention and thus are not limitative of the invention.

DETAILED DESCRIPTION

In order to make objects, technical details and advantages of the embodiments of the invention apparent, the technical solutions of the embodiment will be described in a clearly and fully understandable way in connection with the drawings related to the embodiments of the invention. It is obvious that the described embodiments are just a part but not all of the embodiments of the invention. Based on the described embodiments herein, those skilled in the art can obtain other embodiment(s), without any inventive work, which should be within the scope of the invention.

An embodiment of the invention provides a LCD device, which comprises a liquid crystal panel 1, a backlight module 2 and a metal frame 3, wherein the liquid crystal panel 1 is fastened to the backlight module 2, and the liquid crystal panel 1 is hung onto the backlight module 2 when the LCD device is placed in a vertical state.

The liquid crystal panel is by this means placed in a naturally suspension state, the weight of the liquid crystal panel 1 is supported by the backlight module 2, such that the liquid crystal panel 1 (especially one with a larger size) will not deform caused by its own gravity, thereby ensuring that the liquid crystal panel 1 has a good flatness. It also prevents the liquid crystal panel 1 and the metal frame 3 from pressing against each other, which will in turn prevent the defects of uneven brightness under dark state and light leakage of the liquid crystal panel 1 and further improve the display quality of the display.

In order to make those skilled in the art understand the invention in a better way, embodiments of the invention will be described in detail, in connection with FIGS. 4 to 12, through a LCD device that hang the liquid crystal panel.

Figure 1:
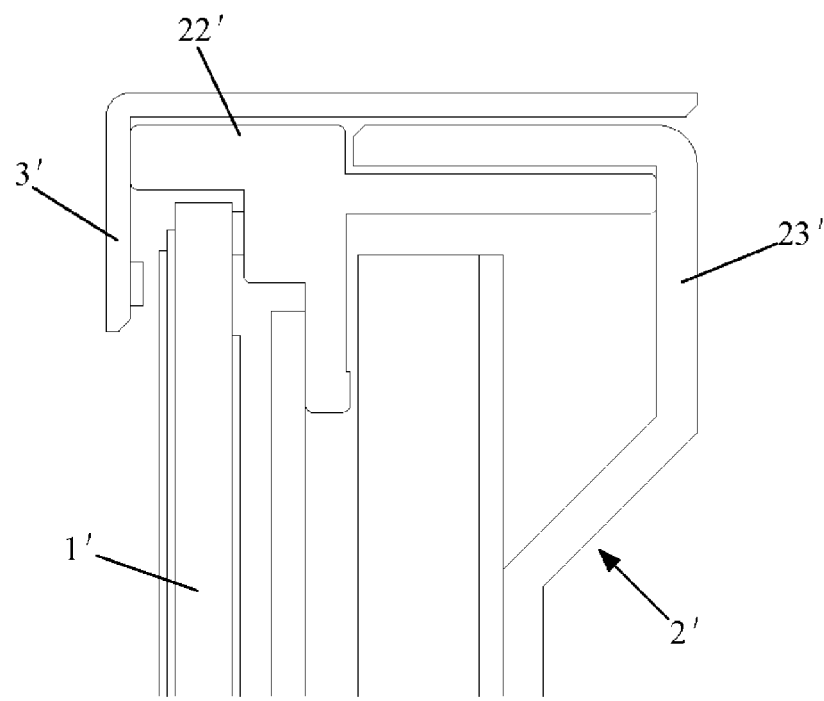
FIG. 1 schematically illustrates a configuration of a known LCD device.
Figure 2:
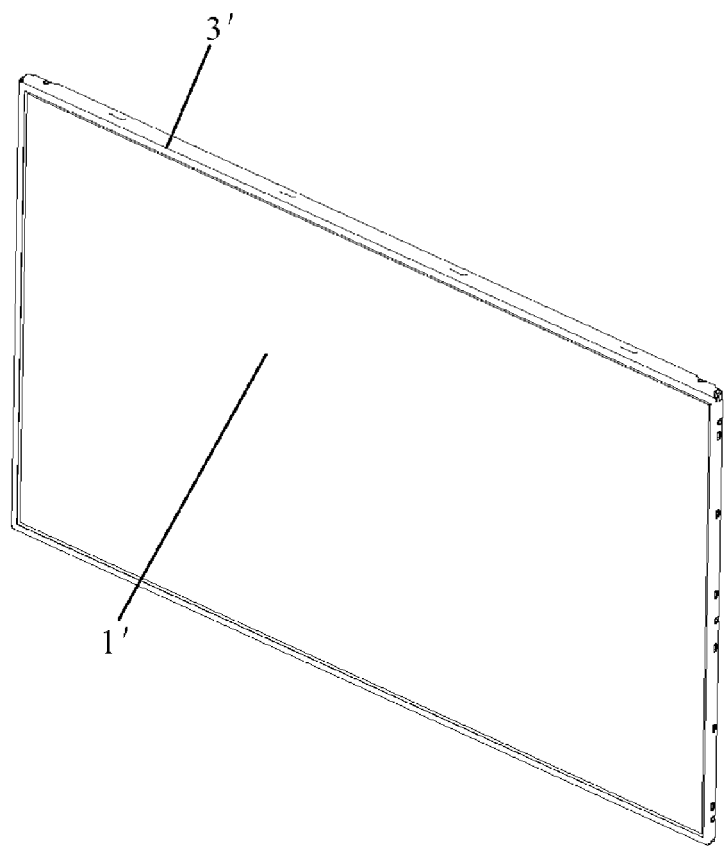
FIG. 2 schematically illustrates an assembled LCD device.
Figure 3:
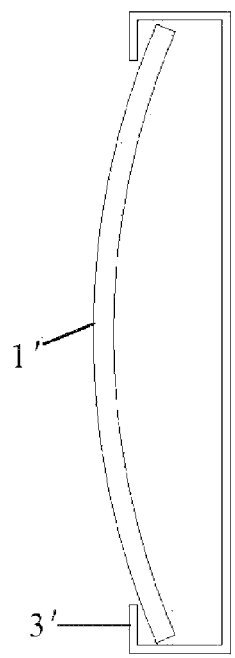
FIG. 3 schematically illustrates a deformed liquid crystal panel.
Figure 4:
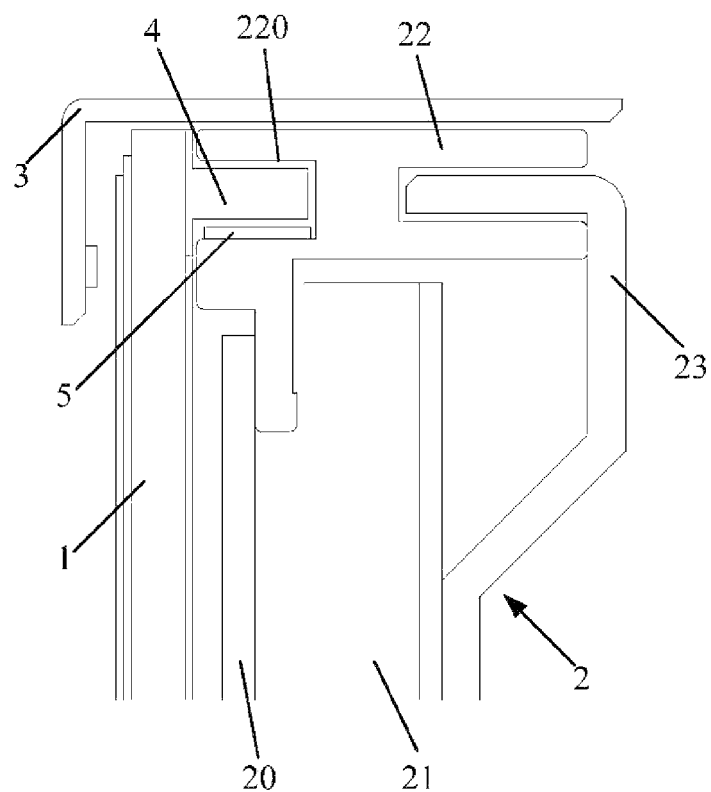
FIG. 4 schematically illustrates a first configuration of a LCD device in accordance with an embodiment of the invention.

FIG. 4 is a schematic diagram of a LCD device provided by an embodiment of the invention. With reference to FIG. 4, the LCD device comprises a liquid crystal panel 1, a backlight module 2 and a metal frame 3. Herein, the liquid crystal panel 1 is formed by assembling an array substrate and a color filter substrate to form a cell and filling liquid crystals into the cell. The backlight module 2 comprises a light source, a light guide plate (LGP) 21, an optical film sheet 20, a mold frame 22 and a back plate 23. The mold frame 22 fixes the light source, the LGP 21 and the optical film sheet 20 onto the back plate 23. The liquid crystal panel 1 is fastened to the backlight module 2, the metal frame 3 presses the liquid crystal panel 1 closely against the backlight module 2. When the LCD device is placed in a vertical state, the liquid crystal panel 1 is hung onto the backlight module 2. For the convenience of description and understanding, the following description is directed to an orientation where the LCD device is placed in the vertical state.

As illustrated in FIG. 4, the above liquid crystal panel 1 may be hung onto the backlight module 2 with a following first implementation: the mold frame 22 is used to support the weight of the liquid crystal panel 1. That is to say, at least one hanging post 4 is disposed on a side face of the liquid crystal panel 1 illustrated in FIG. 4 which contacts the mold frame 22. Accordingly, a hanging groove 220 for receiving the hanging post 4 is disposed on a side face of the mold frame 22 which contacts the liquid crystal panel 1. By this means, the mold frame 22 not only hangs the liquid crystal panel 1, but also precisely positions the liquid crystal panel 1 with the configuration of the hanging post 4 and the hanging groove 220 when the liquid crystal panel 1 is horizontally positioned on the mold frame 22, which will facilitate the assembly of the liquid crystal panel. 1

The weight of the liquid crystal panel 1 may be supported by the back plate 23. Meanwhile, if it is allowed, the metal frame 3 may also be used to support the weight of the liquid crystal panel 1. The invention will be described in detail with reference to an embodiment where the mold frame 22 supports the weight of the liquid crystal panel 1.

As the mold frame 22 supports the weight of the liquid crystal panel 1, a surface of the hanging groove 220 at the bottom portion along the vertical direction is a stressed surface. Especially when the liquid crystal panel 1 is of a larger size, the stressed surface may be damaged by the large weight of the liquid crystal panel 1, which will further affect the stability of the suspension of the liquid crystal panel 1. To prevent such a situation, a pad 5 is disposed between the bottom surfaces of the hanging post 4 and the hanging groove 220 that contact with each other in the vertical direction. A material of the pad 5 may be plastic material, silicon material or the like.

Though not illustrated in the drawings, it is understandable that those skilled in the art can clearly understand that both the outmost opposite surfaces of the liquid crystal panel 1 are polarizers, therefore, the side face of the liquid crystal panel 1 which contacts the mold frame is a polarizer.

Before hanging the liquid crystal panel 1 on the mold frame 22, the hanging post 4 may be adhered to a side face of the liquid crystal panel 1 which contacts the mold frame 22 (that is, the hanging post 4 is adhered to the polarizer), or it may also be integrally formed with the polarizer, the invention is not limited to that. Instead, other fixation methods known to those skilled in the art may also be used, which can be selected preferably based on practical situations.

Figure 5:
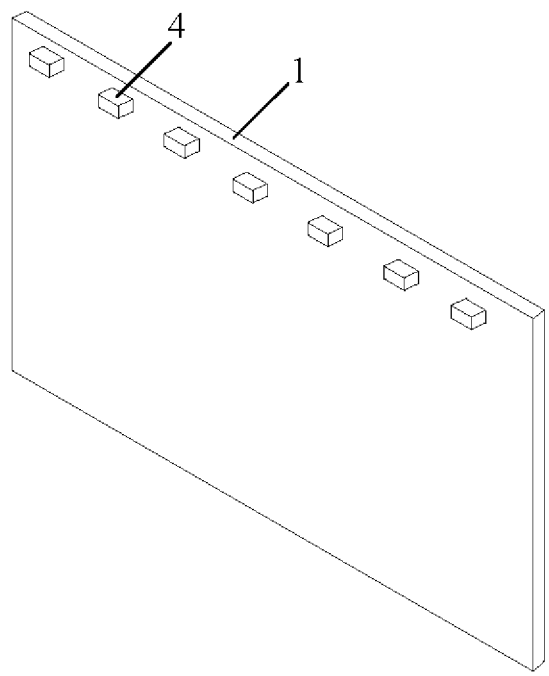
FIG. 5 is a diagram illustrating a first way of disposing a hanging post on the liquid crystal panel of FIG. 4.

The hanging post 4 may be arranged with a first method illustrated in FIG. 5. That is, a plurality of the above hanging posts 4 are disposed juxtapositionally along a horizontal direction on an upper portion of the side face of the liquid crystal panel 1 (the polarizer) which contacts the mold frame 22; accordingly, a plurality of hanging grooves 220 are disposed juxtapositionally along the horizontal direction on an upper portion of the mold frame 22 or one hanging groove 220 for receiving the plurality of hanging posts 4 altogether is disposed on an upper portion of the mold frame 22. It can thereby increase the stressed area of the mold frame 22 that supports the liquid crystal panel 1, such that the stability of suspension of the liquid crystal panel 1 is increased.

Figure 6:
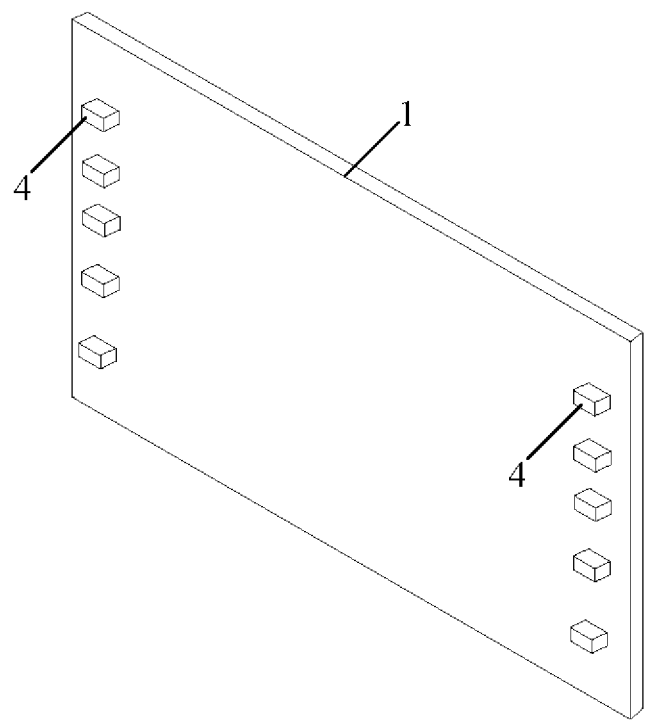
FIG. 6 is a diagram illustrating a second disposition method for a hanging post on the liquid crystal panel of FIG. 4.

The hanging post 4 may also be arranged with a second method, in which a plurality of hanging posts 4 are disposed juxtapositionally along a vertical direction on at least one side portion of the side face of the liquid crystal panel 1 which contacts the mold frame 22; accordingly, a plurality of hanging grooves 220 are disposed juxtapositionally along a vertical direction on at least one side portion of the mold frame 22. To guarantee the strength of the structure, as illustrated in FIG. 6, a plurality of hanging posts 4 are disposed juxtapositionally along the vertical direction on two side portions of the polarizer of the liquid crystal panel 1, and the two columns of hanging posts 4 are symmetrically disposed.

Figure 7:
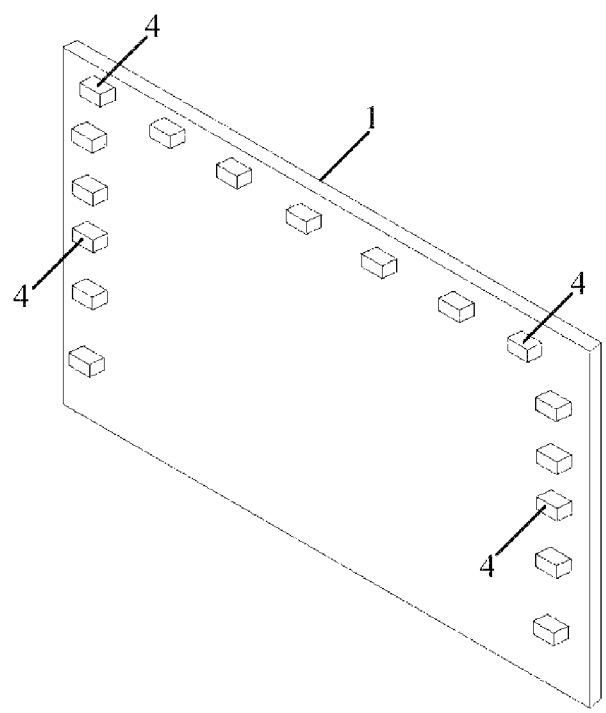
FIG. 7 is a diagram illustrating a third disposition method for a hanging post on the liquid crystal panel of FIG. 4.

As illustrated in FIG. 7, the hanging post 4 may be arranged with a third method, in which a plurality of the above hanging posts 4 are disposed juxtapositionally along the horizontal direction on the upper portion of the side face of the liquid crystal panel 1 (the polarizer) which contacts the mold frame 22 and a plurality of hanging posts 4 are disposed juxtapositionally along a vertical direction on at least one side portion of the polarize; accordingly, a plurality of hanging grooves 220 or one hanging groove 220 (not shown) for receiving the plurality of hanging posts 4 altogether is disposed juxtapositionally along the horizontal direction on the upper portion of the mold frame 22, and a plurality of hanging grooves 220 are disposed juxtapositionally along a vertical direction on at least one side portion of the mold frame 22.

It is noted that methods for arranging the plurality of juxtapositional hanging posts 4 are not limited to the above three methods; moreover, the plurality of juxtapositional hanging posts 4 are not limited to being arranged evenly or unevenly. Instead, the arrangement may be determined based on the specific situation.

Figure 8:
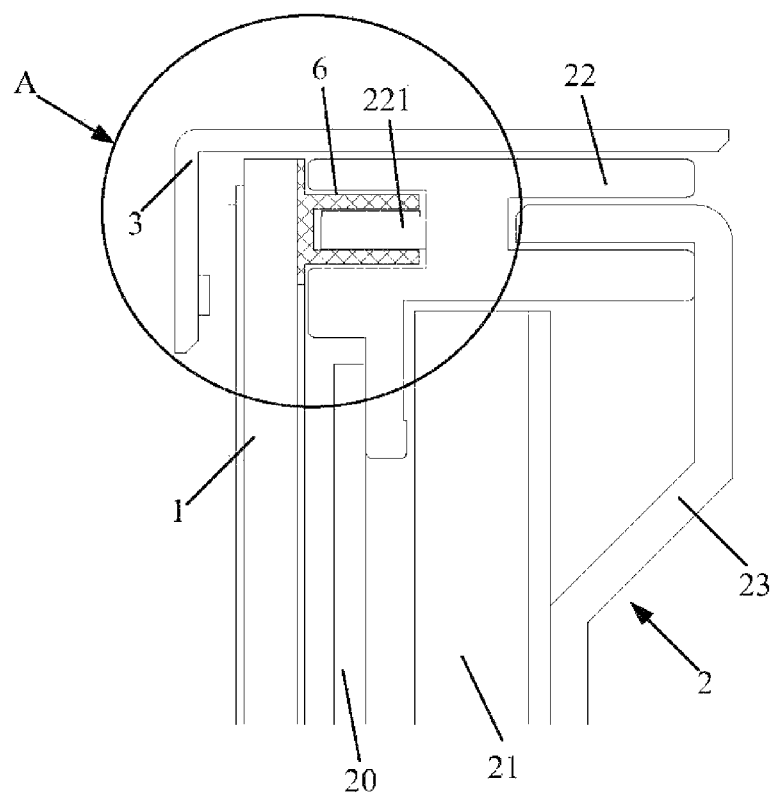
FIG. 8 schematically illustrates a second configuration of a LCD device in accordance with an embodiment of the invention.
Figure 9:
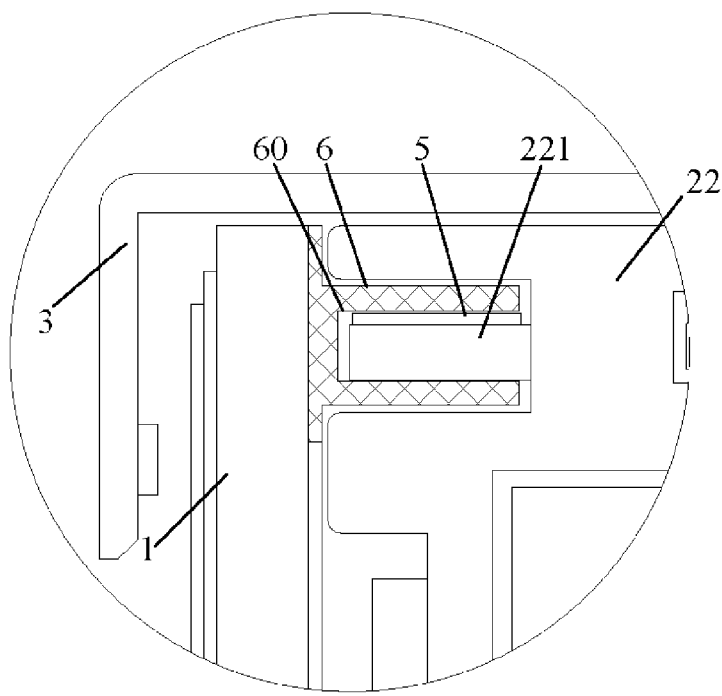
FIG. 9 schematically illustrates an enlarged view of part A of FIG. 8.

As illustrated in FIGS. 8 and 9, the above liquid crystal panel 1 may be hung onto the backlight module 2 with a following second implementation: at least one protrusion 6 is disposed on the side face of the liquid crystal panel 1 which contacts the mold frame 22, a groove 60 is disposed on each protrusion 6; a protruding post 221 received in the groove 60 is disposed on the side face of the mold frame 22 which contacts the liquid crystal panel 1. By this means, the mold frame 22 not only hangs the liquid crystal panel 1, but also more precisely positions the liquid crystal panel 1 when the liquid crystal panel 1 is horizontally positioned on the mold frame 22, which will facilitate the assembly of the liquid crystal panel 1.

As the mold frame 22 supports the weight of the liquid crystal panel 1, a top surface of the protrusion 6 in the vertical direction is a stressed surface. Especially when the liquid crystal panel 1 is of a larger size, the stressed surface may be damaged by the large weight of the liquid crystal panel 1, which will further affect the stability of the suspension of the liquid crystal panel 1. To prevent such a situation, a pad 5 is disposed between the top contact surfaces of the protruding post 221 and the groove 60 that contacts with each other in the vertical direction. A material of the pad 5 may be plastic material, silicon material or the like.

Before hanging the liquid crystal panel 1 on the mold frame 22, the protrusion 6 may be adhered to the side face of the liquid crystal panel 1 which contacts the mold frame 22 (that is, the protrusion 6 is adhered to the polarizer). It may also be integrally formed with the polarizer, though the invention is not limited to that. Instead, other fixation methods known to those skilled in the art may also be used, which can be selected preferably based on practical situations.

Figure 10:
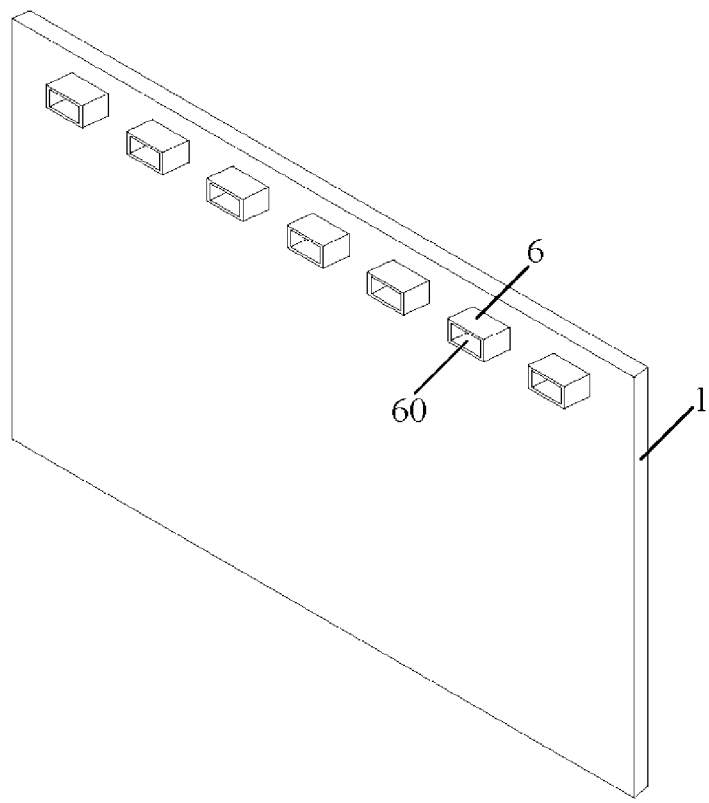
FIG. 10 is a diagram illustrating a first disposition method for a protrusion on the liquid crystal panel of FIG. 8.

As illustrated in FIG. 10, the protrusions 6 may be arranged with a first method, in which a plurality of protrusions 6 each having groove 60 are disposed juxtapositionally along the horizontal direction on an upper portion of the side face of the liquid crystal panel 1 which contacts the mold frame 22; accordingly a plurality of protruding posts 221 are disposed juxtapositionally along the horizontal direction on an upper portion of the mold frame 22. It can thereby increase the stressed area of the mold frame 22 that supports the liquid crystal panel 1, such that the stability of suspension of the liquid crystal panel 1 is increased.

Figure 11:
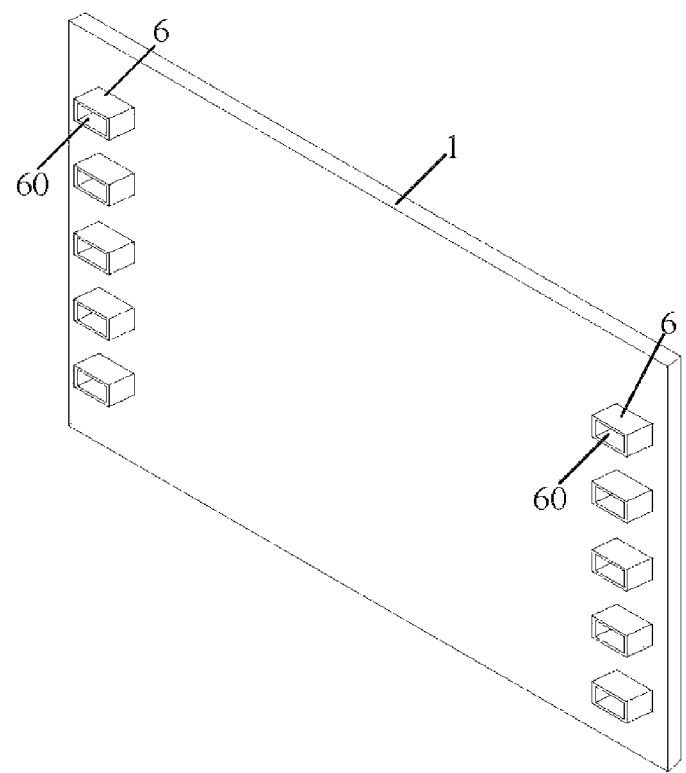
FIG. 11 is a diagram illustrating a second disposition method for a protrusion on the liquid crystal panel of FIG. 8.

The protrusions 6 may also be arranged with a second method, in which a plurality of protrusions 6 each having groove 60 are disposed juxtapositionally along a vertical direction on at least one side portion of the side face of the liquid crystal panel 1 which contacts the mold frame 22; accordingly a plurality of protruding posts 221 are disposed juxtapositionally along a vertical direction on at least one side portion of the mold frame 22. To guarantee the strength of the structure, as illustrated in FIG. 11, a plurality of protrusions 6 are disposed juxtapositionally along the vertical direction on two side portions of the polarizer of the liquid crystal panel 1, and the two columns of protrusions 6 are symmetrically disposed.

Figure 12:
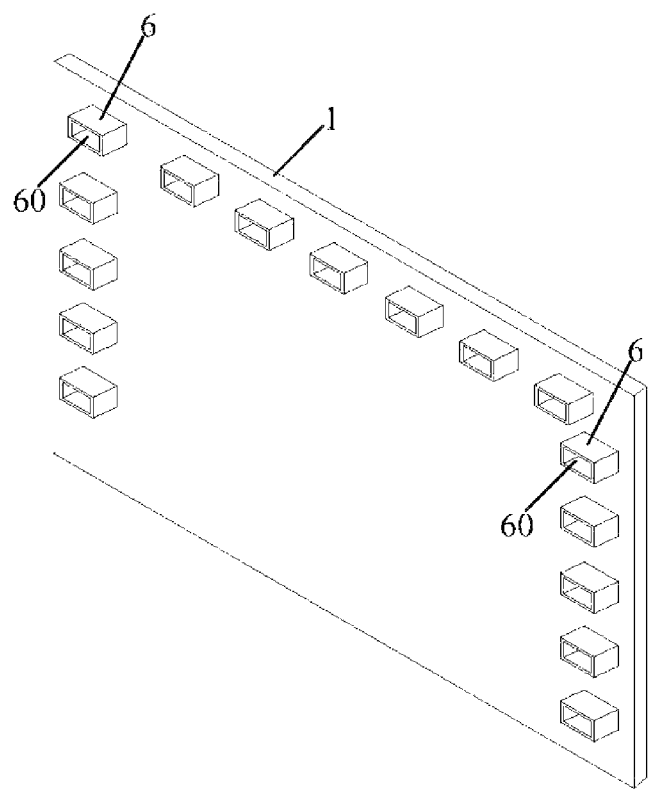
FIG. 12 is a diagram illustrating a third disposition method for a protrusion on the liquid crystal panel of FIG. 8.

As illustrated in FIG. 12, the protrusions 6 may be arranged with a third method, in which a plurality of the above protrusions 6 each having groove 60 are disposed juxtapositionally along the horizontal direction on the upper portion of the side face of the liquid crystal panel 1 (the polarizer) which contacts the mold frame 22 and a plurality of protrusions 6 each having groove 60 are disposed juxtapositionally along a vertical direction on at least one side portion of the polarizer; accordingly, a plurality of hanging protruding posts 221 are disposed juxtapositionally along the horizontal direction on the upper portion of the mold frame 22, and a plurality of protruding posts 221 are disposed juxtapositionally along a vertical direction on at least one side portion of the mold frame 22.

It is noted that methods for arranging the plurality of juxtapositional protrusions 6 are not limited to the above three methods; moreover, the plurality of juxtapositional protrusions 6 are not limited to being arranged evenly or unevenly. Instead, the arrangement may be determined based on the specific situation.

The above liquid crystal panel 1 may be hung onto the backlight module 2 with a following third implementation: a plurality of the above protrusions 6 each having groove 60 are disposed juxtapositionally along the horizontal direction on an upper portion of the polarizer, and a plurality of the above hanging posts 4 are disposed juxtapositionally along a vertical direction on at least one side portion of the polarizer; accordingly, a plurality of protruding posts 221 are disposed juxtapositionally along the horizontal direction on an upper portion of the mold frame 22, and a plurality of hanging grooves 220 are disposed juxtapositionally along a vertical direction on at least one side portion of the mold frame 22.

The above liquid crystal panel 1 may be hung onto the backlight module 2 with a following fourth implementation: a plurality of the above hanging posts 4 are disposed juxtapositionally along the horizontal direction on an upper portion of the polarizer, and a plurality of protrusions 6 each having groove 60 are disposed juxtapositionally along a vertical direction on at least one side portion of the polarizer; accordingly, a plurality of hanging grooves 220 or one hanging groove 220 for receiving the plurality of hanging posts 4 altogether is disposed juxtapositionally along the horizontal direction on an upper portion of the mold frame 22, and a plurality of protruding posts 221 are disposed juxtapositionally along a vertical direction on at least one side portion of the mold frame 22.

Furthermore, a plurality of hanging posts 4 and a plurality of protrusions 6 having grooves 60 are disposed juxtapositionally along the horizontal direction on an upper portion of the polarizer, and the hanging posts 4 and protrusions 6 are not limited to being disposed alternately; accordingly, a plurality of hanging grooves 220 and a plurality of protruding posts 221 are disposed juxtapositionally along the horizontal direction on an upper portion of the mold frame 22. It is also applicable to the hanging configuration disposed on two side portions of the polarizer.

Though not illustrated in the drawings, those skilled in the art will understand that the LCD device further comprises a heat dissipation plate, a circuit board, a driver, a wire bundle and the like. Those will also understand that the illustrated configurations of the LCD device in the drawings are not intended to limit the LCD device.

The above LCD device may be applicable to household televisions, a mobile television, a tablet PC, a Personal Digital Assistant (PDA), an in-vehicle computer, a mobile phone and any electronic devices and appliance having a display function.

What are described above is related to the illustrative embodiments of the disclosure only and not limitative to the scope of the disclosure; the scopes of the disclosure are defined by the accompanying claims.

What is claimed is:

1. A liquid crystal display device, comprising:
a liquid crystal panel and a backlight module, wherein the liquid crystal panel is hung onto the backlight module when the LCD device is placed in a vertical state; at least one hanging post is disposed on a side face of the liquid crystal panel which contacts the backlight module; and the backlight module comprises a mold frame, at least one hanging groove for receiving the hanging post is disposed on a side face of the mold frame which contacts the liquid crystal panel; and
an optical film sheet, wherein the liquid crystal panel comprises a protrusion portion extending beyond an outer edge of the optical film sheet in a direction parallel to the side face of the liquid crystal panel; and the hanging post is arranged at the protrusion portion of the liquid crystal panel.

2. The liquid crystal display device of claim 1, wherein a pad is disposed between bottom contact surfaces of the hanging post and the hanging groove, and the bottom contact surfaces contact with each other in a vertical direction.

3. The liquid crystal display device of claim 2, wherein the hanging post is adhered to the side face of the liquid crystal panel which contacts the mold frame.

4. The liquid crystal display device of claim 1, wherein a plurality of hanging posts are disposed juxtapositionally along a horizontal direction on an upper portion of the side face of the liquid crystal panel which contacts the mold frame, and a plurality of hanging grooves or one hanging groove for receiving the plurality of hanging posts altogether is disposed juxtapositionally along the horizontal direction on an upper portion of the mold frame.

5. The liquid crystal display device of claim 1, wherein a plurality of hanging posts are disposed juxtapositionally along a vertical direction on at least one side portion of the side face of the liquid crystal panel which contacts the mold frame, and a plurality of hanging grooves are disposed juxtapositionally along a vertical direction on at least one side portion of the mold frame.

6. A liquid crystal display device, comprising: a liquid crystal panel and a backlight module, wherein
the liquid crystal panel is hung onto the backlight module when the LCD device is placed in a vertical state;
at least one protrusion is disposed on a side face of the liquid crystal panel which contacts the backlight module, a groove is disposed on the protrusion;
the backlight module comprises a mold frame, at least one protruding post is disposed on a side face of the mold frame which contacts the liquid crystal panel, the protruding post is received in the groove.

7. The liquid crystal display device of claim 6, wherein a pad is disposed between top contact surfaces of the protruding post and the groove, the top contact surfaces contact with each other in a vertical direction.

8. The liquid crystal display device of claim 7, the protruding post is adhered to the side face of the liquid crystal panel which contacts the mold frame.

9. The liquid crystal display device of claim 6, a plurality of protrusions are disposed juxtapositionally along a horizontal direction on an upper portion of the side face of the liquid crystal panel which contacts the mold frame, and a plurality of protruding posts are disposed juxtapositionally along a horizontal direction on an upper portion of the mold frame.

10. The liquid crystal display device of claim 6, a plurality of protrusions are disposed juxtapositionally along a vertical direction on at least one side portion of the side face of the liquid crystal panel which contacts the mold frame, and a plurality of protruding posts are disposed juxtapositionally along a vertical direction on at least one side portion of the mold frame.

11. The liquid crystal display device of claim 2, wherein a plurality of hanging posts are disposed juxtapositionally along a horizontal direction on an upper portion of the side face of the liquid crystal panel which contacts the mold frame, and a plurality of hanging grooves or one hanging groove for receiving the plurality of hanging posts altogether is disposed juxtapositionally along the horizontal direction on an upper portion of the mold frame.

12. The liquid crystal display device of claim 3, wherein a plurality of hanging posts are disposed juxtapositionally along a horizontal direction on an upper portion of the side face of the liquid crystal panel which contacts the mold frame, and a plurality of hanging grooves or one hanging groove for receiving the plurality of hanging posts altogether is disposed juxtapositionally along the horizontal direction on an upper portion of the mold frame.

13. The liquid crystal display device of claim 2, wherein a plurality of hanging posts are disposed juxtapositionally along a vertical direction on at least one side portion of the side face of the liquid crystal panel which contacts the mold frame, and a plurality of hanging grooves are disposed juxtapositionally along a vertical direction on at least one side portion of the mold frame.

14. The liquid crystal display device of claim 3, wherein a plurality of hanging posts are disposed juxtapositionally along a vertical direction on at least one side portion of the side face of the liquid crystal panel which contacts the mold frame, and a plurality of hanging grooves are disposed juxtapositionally along a vertical direction on at least one side portion of the mold frame.

15. The liquid crystal display device of claim 7, a plurality of protrusions are disposed juxtapositionally along a horizontal direction on an upper portion of the side face of the liquid crystal panel which contacts the mold frame, and a plurality of protruding posts are disposed juxtapositionally along a horizontal direction on an upper portion of the mold frame.

16. The liquid crystal display device of claim 8, a plurality of protrusions are disposed juxtapositionally along a horizontal direction on an upper portion of the side face of the liquid crystal panel which contacts the mold frame, and a plurality of protruding posts are disposed juxtapositionally along a horizontal direction on an upper portion of the mold frame.

17. The liquid crystal display device of claim 7, a plurality of protrusions are disposed juxtapositionally along a vertical direction on at least one side portion of the side face of the liquid crystal panel which contacts the mold frame, and a plurality of protruding posts are disposed juxtapositionally along a vertical direction on at least one side portion of the mold frame.

18. The liquid crystal display device of claim 8, a plurality of protrusions are disposed juxtapositionally along a vertical direction on at least one side portion of the side face of the liquid crystal panel which contacts the mold frame, and a plurality of protruding posts are disposed juxtapositionally along a vertical direction on at least one side portion of the mold frame.

* * * * *